Patented July 25, 1950

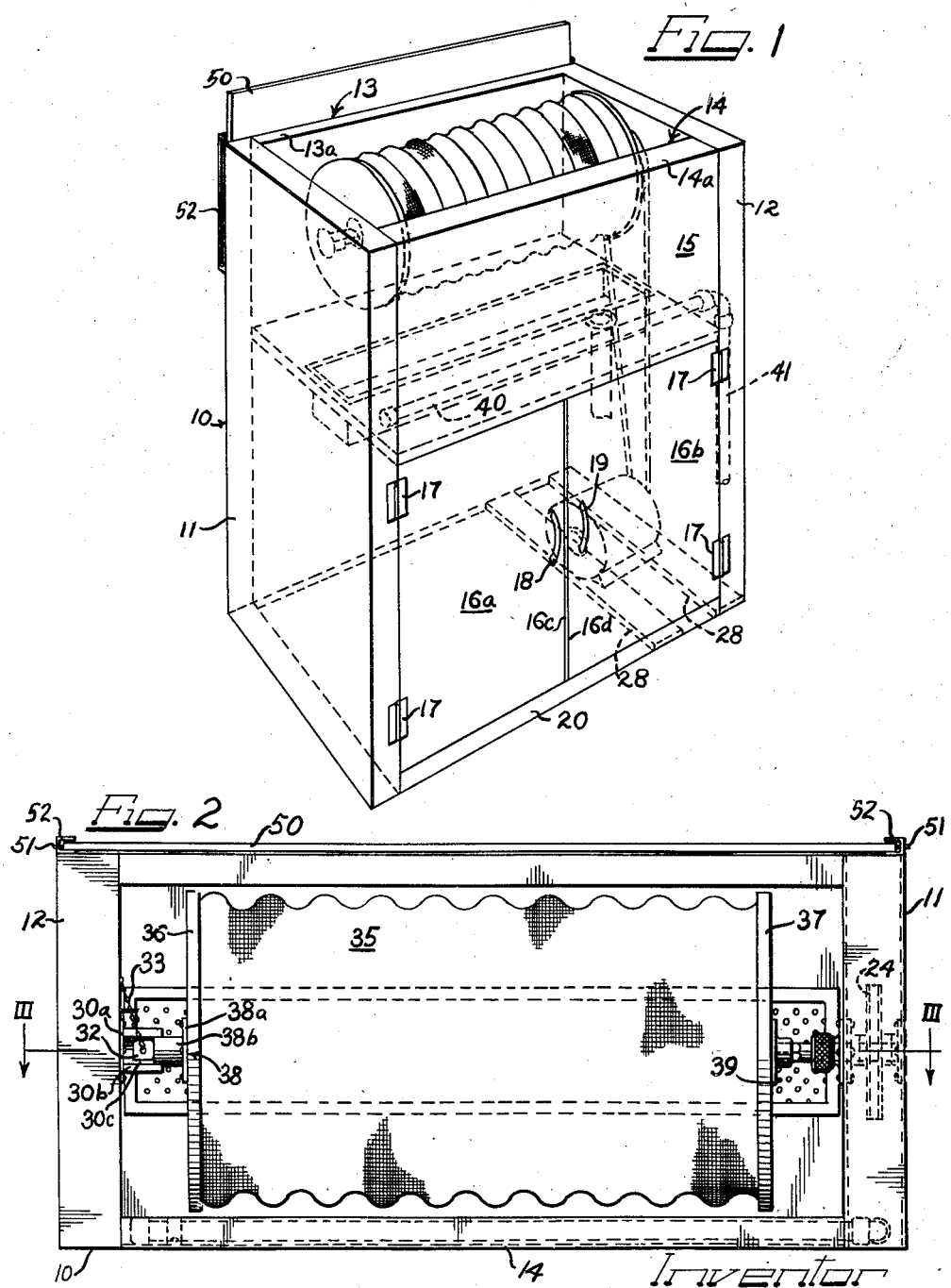

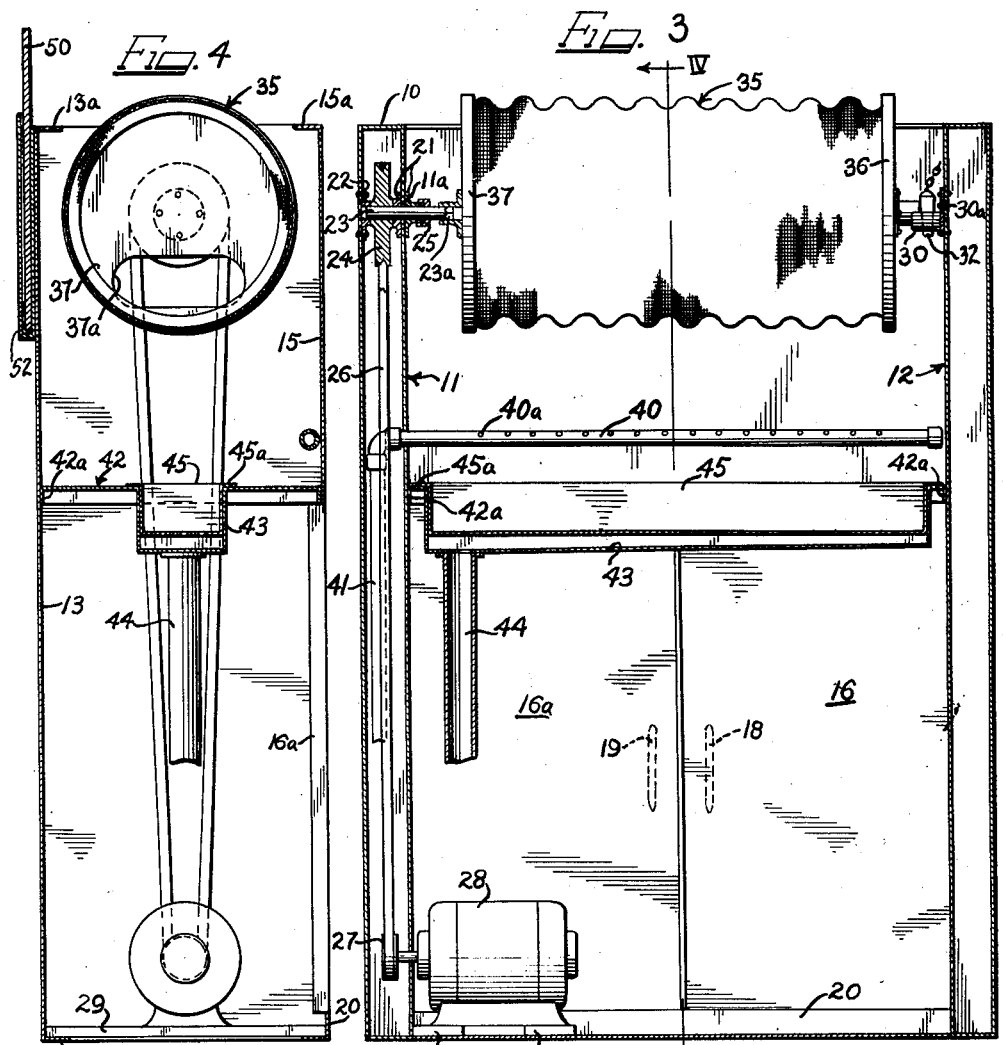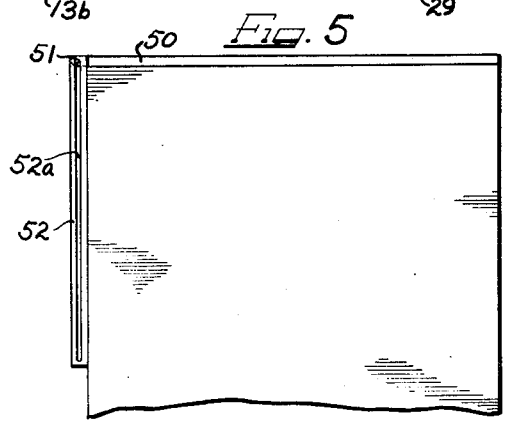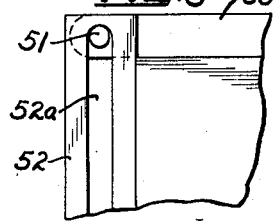

2,516,250

UNITED STATES PATENT OFFICE 2,516,250

VEGETABLE PEELING APPARATUS

John B. Patterson, Wichita, Kans.

Application February 20, 1947, Serial No. 729,765

2 Claims. (Cl. 146—50)

This invention relates to an apparatus for peeling vegetables or the like. More particularly, this invention relates to an apparatus for peeling vegetables of the type wherein a rotating drum means for peeling vegetables is mounted in a utility cabinet such as may be conveniently used in a restaurant.

In the kitchens of restaurants and other similar establishments where food in large quantities is prepared, work space is usually very limited. Ordinarily space must be provided for an apparatus for automatically peeling those vegetables which lend themselves to this type of preparation, a vegetable sink equipped with a water spray connection for preparing vegetables manually and a flat-top work space useful for many operations. Other devices such as stoves and refrigerators must also be accommodated, and, therefore, it is readily apparent that any apparatus which may be used for efficiently performing several of these necessary operations will be readily accepted and applied in the average restaurant.

With this in mind, it is an important object of this invention to provide a novel vegetable peeling apparatus mounted in a cabinet which is so constructed and designed that it may be used in a number of food preparing operations.

It is a further object of this invention to provide a vegetable peeling device of the rotating drum type having a novel peeling contact surface.

A still further object of this invention is to provide a vegetable peeling device in which the rotating drum is removably mounted.

Another object of this invention is to provide a vegetable peeling device having a rotating drum and a device associated therewith for spraying water over the drum as the drum is rotated.

Another and further object of this invention is to provide a novel cabinet which incorporates a removable member for draining the refuse which has been washed out of the rotating drum.

Another and still further object of this invention is to provide a vegetable peeling device having a drum for peeling vegetables and a cover portion operable in the open position to prevent spreading of refuse.

A further object of this invention is the provision of novel means of positioning the drum so that it may be readily mounted and locked in operating position.

According to the general features of this invention, there is provided a drum removably positioned for rotation within an upper sink portion of a cabinet, said drum being driven from an electric motor mounted in the lower part of said cabinet, and said sink portion comprising a drain member having a removable strainer element positioned therein and a device for subjecting said vegetables to a spray of water while they are being peeled.

A further feature of this invention is the provision of a novel drum having a corrugated contact surface of expanded metal, metal lath or sheet metal having an inner surface for abrading or peeling vegetables as they are tumbled in the drum.

Another feature is the provision of a novel socket member comprising a journal portion and a plug positionable in an aperture in the journal portion to abut one side of the shaft of a drum rotatably mounted therein for holding said shaft against axial movement.

A still further feature is the provision of a cover member adapted to be positioned over the upper sink portion of the cabinet when the peeling drum is not being used and movable into an upright position in a recess in the back of said cabinet with a portion of said cover member projecting above the upper surface to act as a guard against the spread of refuse from the vegetables when the peeling drum is in operation.

The novel features which I believe to be characteristic of my invention are set forth in the appended claims. My invention, however, both as to its manner of construction and method of operation, together with further objects and advantages thereof may best be understood by reference to the following description, taken in connection with the accompanying drawings, in which:

Figure 1 is a perspective view of a peeling apparatus embodying the novel features and characteristics of the present invention;

Figure 2 is a plan view of the apparatus of this invention, particularly showing the means for locking the drum in its operating position;

Figure 3 is a vertical sectional view taken substantially on line III—III of Figure 2 looking toward the front of the cabinet as indicated by the arrows;

Figure 4 is a vertical sectional view taken on line IV—IV of Figure 3 looking in the direction indicated by the arrows;

Figure 5 is a fragmentary side elevational view showing a cover member positioned over the top of the cabinet as when the drum has been removed; and Figure 6 is an enlarged fragmentary view of the upper corner of Figure 5 illustrating the means for pivoting the cover member on the cabinet.

As shown on the drawings:

Reference numeral 10 indicates an upright cabinet comprising side wall members 11 and 12, a rear wall member 13, and a front wall member 14. This cabinet may conveniently be made of sheet metal having a commercial unfinished or finished surface such as would make the cabinet suitable for use in the kitchen of an average restaurant.

As best seen in Figure 3, each side wall 11 and 12 is actually a double wall consisting of two side members joined to cross members at the top and the bottom and by closure plates at the front and rear. For ease in servicing a drive mechanism, to be described hereinafter, positioned between the inner and outer side members of the wall, the top and bottom plates of the side walls may be made removable. The rear wall 13 is substantially a flat sheet member having an upper flange 13a and a lower flange 13b each extending forwardly toward the front of the machine. The front wall 14 has an upper vertical portion 15 including a rearwardly extending flange 15a and a lower portion 16 comprising two outwardly swingable doors 16a and 16b mounted by hinges 17 on the side walls 11 and 12, respectively. Handles 18 and 19 are provided on the doors near the center vertical marginal edges 16c and 16d of the doors which may be equipped with any suitable retaining member for holding the doors closed when put in a substantially abutting relation. An angle member 20 is positioned below the doors, extending across the front of the cabinet and secured at either end as by welding to the side walls 11 and 12.

Referring to Figure 3, it is seen that there is provided an aperture 11a in the upper portion of the inner side wall 11. A flange 21, which has a central opening in alignment with the aperture 11a, is secured to either side of the inner member of the side wall 11, as by riveting. In similar manner a flange 22 is secured to the outer member of the side wall 11 facing inwardly and having its central opening directly opposite the opening in the flange 21. These flanges are adapted to receive for rotation therein a shaft 23 which is keyed to a pulley wheel 24 and which has a square end 23a. A packing gland 25 is disposed over one end of the inner flange 21 to prevent leakage of oil along the shaft. The pulley wheel 24 is driven by a belt 26 disposed around a driving pulley wheel 27 which is driven by an electric motor 28. The motor may be conveniently mounted on a pair of cross members 29 which are rigidly supported on the angle member 20 of the front wall and the flange 13b of the rear wall.

On the inner side member of the side wall 12 directly opposite the flange 21 of the side wall 11, is a bearing member 30 comprising a vertical flange portion 30a suitably secured, as by riveting, to the wall and an inwardly projecting bearing portion 30b which is substantially a half cylinder with its open side facing upwardly. An aperture 30c in the bearing 30 is adapted to receive a tapered plug 32 which may for convenience be secured to the side wall 12 by a chain 33.

As seen in Figure 2, a cylindrical drum 35 is adapted to be positioned in the cabinet 10 for rotation by the pulley 24. The drum 35 comprises end plates 36 and 37 between which is secured a corrugated abrading or peeling element in the form of a cylindrical sheet of expanded metal, metal lath or sheet metal having a plurality of openings and inwardly projecting contact surfaces for removing the skin or surface covering from vegetables.

On the outer side of the wall 36 is secured a journal member 38 consisting of a vertical flange portion 38a suitably attached to the wall and an outwardly extending shaft portion 38b. The outer side of the wall 37 carries a flange member 39 provided with a square-shaped aperture adapted to receive the square end 23a of the shaft 23.

In at least one end of the drum 35, as in the end plate 37, there is provided an opening 37a of any suitable configuration for filling and emptying the vegetables in the drum.

To mount the drum 35 for rotation in the cabinet, the square-shaped aperture of the flange 39 is positioned over the square inwardly extending shaft 23. The journal member 38 is then moved into place on the bearing member 30. The drum 35 is pushed to the right as far as possible, as seen in Figure 2, thus uncovering the aperture 30c in the bearing 30. The tapered plug 32 is then placed in the bearing aperture 30c. In this manner, the drum 35 is disposed for rotation by means of the pulley 25 about the axis of the shaft 23 and locked by the plug 32 against axial movement.

A spray of water is directed on the rotating drum 35 by means of a pipe 40 disposed substantially parallel to the axis of the drum and positioned below and forwardly from the drum. This pipe 40 has a plurality of discharge holes 40a facing the drum and is suitably connected to a vertical supply pipe 41 which may be connected between the inner and outer members of the wall 11.

Immediately below the spray pipe 40 and extending across the entire area between the four walls of the cabinet 10, as seen in Figures 3 and 4, is a drain board 42, having a downwardly extending flange 42a secured as by welding to the four side walls. A trough 43 disposed substantially halfway between the front and rear walls and having a length greater than that of the drum 35 is provided for directing the water to the drain. The end of the trough 43 adjacent the side wall 12 is somewhat higher than the end adjacent the side wall 11, thus causing the water to flow to a waste pipe 44 suitably secured in an opening in the lower end.

A removable strainer tray 45, having the same shape as the trough 43, but being arranged to fit inside the trough, is adapted to be suspended therein from an upper flange 45a which projects over the edge of the trough. The bottom plate of the tray 45 is perforated permitting liquid to pass therethrough to the drain below while retaining solid refuse such as peelings from vegetables.

A removable cover is provided for the cabinet 10 in the form of a rectangular member 50 which is of a size to completely cover the upper surface of the cabinet when moved to a closing position. It is to be understood that the drum 35 must be removed before the cover 50 can be closed. As illustrated in Figures 2, 4 and 5, in the open position, the cover 50 is adapted to be held in a vertical position by means of two pins 51 extending sidewardly from the side edge of the cover 50 in sliding engagement in a slot 52a in channel members 52 which are secured in a vertical position as by welding to the back wall 13. When the cover is slid downward into channel members 52, the pins 51 will come to rest against the lower end of the slots 52a. The slots 52a are of a length such that a substantially large part of the upper portion of the cover 50 will extend above the top surface of the cabinet affording a splash plate or shield to prevent to a large extent water and refuse being thrown against any adjacent object such as a wall against which the machine has been placed.

As shown in Figure 6, the lower edge of the cover 50 is rounded, as at 50a, to afford easy pivoting of the cover in the channel members 52. It is further to be noted, as in Figure 4, that the forward edge of the channel 52 does not extend above the top of the machine proper in order that the cover may be positioned snugly on the machine.

In operation, the skins of any vegetables such as potatoes placed in the drum 35 will be removed by the abrading or peeling inner surface of the drum as the drum is rotated and the vegetables tumbled therein. The novel corrugated configuration of the drum permits the cutting surface to come in contact with indentations in the body of the vegetables. As the skin is removed from the vegetables, the spray of water is directed onto the drum and washes the skins out of the drum down into the strainer sink. Here the liquid will pass through the strainer while the refuse will be retained in the strainer and may be periodically removed by removing the strainer from the drain plate. This novel type of drum which is economical to manufacture and very efficient in operation, is driven by a simple, efficient drive means. The removable tapered plug used in connection with the bearing seat is considered to be a completely novel means for locking a rotating drum against axial movement while permitting rotation in the bearing.

It is readily apparent that when the rotating drum is not being used for peeling vegetables which may be peeled by that method, it may be removed and placed in the lower part of the cabinet in the compartment afforded by the open space inside the doors 16a and 16b. There is then provided in the upper part of the cabinet a complete sink unit equipped with a water spray. Vegetables, fruits and the like may then be prepared manually in this sink portion.

When a flat-top work space is desired, the cover member 15 may be slid up from the back side of the cabinet and revolved into position on top of the cabinet, thus providing the work space required.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a vegetable peeling apparatus including a power driven hollow drum having an interior abrasive surface for removing skin from the vegetables and a pipe supplying water to the compartment in which the drum rotates, the improvement which comprises a cabinet having an open top, a central inner chamber, a hollow side wall receiving the drive mechanism for said drum, a shelf in said chamber defining an upper compartment for a rotating drum and a lower storage compartment, drainage means leading from said upper compartment downwardly through said shelf, a cover plate pivotal from a closing position over said open top to an upright position against the back wall of the cabinet with a portion extending thereabove and access doors for said storage compartment.

2. In a vegetable peeling apparatus including a power driven hollow drum having an interior abrasive surface for removing skin from the vegetables and a pipe supplying water to the compartment in which the drum rotates, the improvement which comprises a cabinet having an open top, a central inner chamber, a hollow side wall receiving the drive mechanism for said drum, a shelf in said chamber defining an upper chamber for the rotating drum and a lower storage compartment, drainage means leading from said upper compartment downwardly through said shelf, a cover plate pivotal from a closing position over said open top to an upright position against the back wall of the cabinet with a portion extending thereabove, and slotted angle members secured substantially vertically at the corners of the back wall of said cabinet providing a guide passageway for receiving said cover plate when pivoted to said upright position, the slotted passage in said angle member receiving a pin on said cover plate for guiding movement therein and for limiting the downward movement of said cover plate.

JOHN B. PATTERSON.

REFERENCES CITED

The following references are of record in the file of this patent:

UNITED STATES PATENTS

| Number | Name | Date |
|---|---|---|
| 179,705 | Law | July 11, 1876 |
| 233,674 | Hayes et al. | Oct. 26, 1880 |
| 612,398 | Carver | Oct. 18, 1898 |
| 946,175 | Walton | Jan. 11, 1910 |
| 1,462,911 | Hanson | July 24, 1923 |
| 1,973,072 | Hobson | Sept. 11, 1934 |
| 2,100,793 | Urschel | Nov. 30, 1936 |
| 2,174,322 | Hatfield | Sept. 26, 1939 |
| 2,323,107 | Wilson | July 29, 1943 |

FOREIGN PATENTS

| Number | Country | Date |
|---|---|---|
| 69,621 | Norway | Oct. 8, 1945 |
| 222,249 | Great Britain | Oct. 2, 1924 |